J. G. RICHERT.
FILTER BASIN.
APPLICATION FILED MAR. 17, 1910.
964,694.
Patented July 19, 1910.
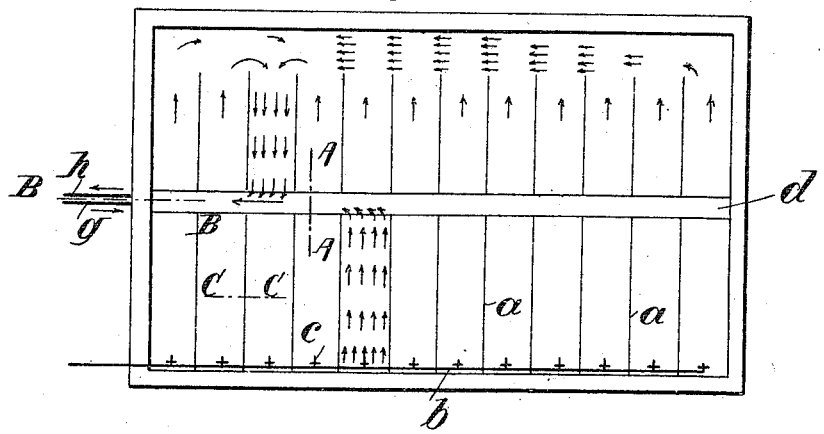
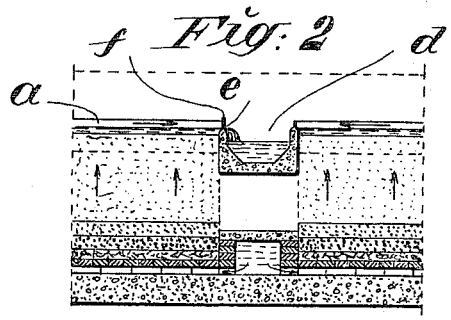
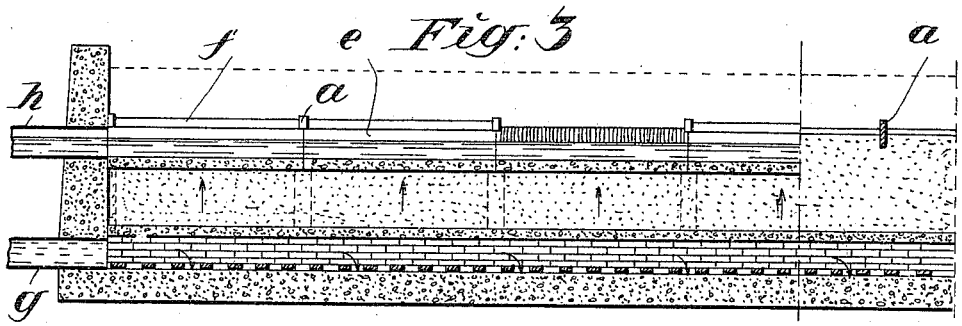
WITNESSES:
R. E. Babcock
J. M. Copenhaver
INVENTOR
Johan G. Richert
BY
W. H. Babcock
ATTORNEY.

UNITED STATES PATENT OFFICE.

JOHAN GUSTAF RICHERT, OF STOCKHOLM, SWEDEN.

FILTER-BASIN.

964,694.  Specification of Letters Patent.  Patented July 19, 1910.

Application filed March 17, 1910. Serial No. 550,019.

*To all whom it may concern:*

Be it known that I, JOHAN GUSTAF RICHERT, consulting engineer, late professor, a subject of the King of Sweden, residing at Norrmalmstorg 16, Stockholm, in the Kingdom of Sweden, have invented certain new and useful Improvements in Filter-Basins; and I do hereby declare the following to be a full, clear, and exact description of the invention, such as will enable others skilled in the art to which it appertains to make and use the same.

This invention relates to filters, more particularly to sand filters, its object being to provide a large filter, the sand surface being divided into fields each washed separately, in the usual way, the water being introduced and let off by new, novel and better means than heretofore.

In the accompanying drawings, Figure 1 represents a top plan view of a filter bed embodying my invention, Fig. 2 represents a vertical sectional view on the line A—A of Fig. 1 showing the channel $d$ and channel $i$, and Fig. 3 represents two vertical sectional views on B B and lines C—C respectively of Fig. 1.

$a$, designates low partitions of plate iron or reinforced concrete dividing the sand surface into rectangular fields. According to my preferred form these partitions do not extend quite to the side of the bed, but leave an open passage connecting all the beds at their outer ends, thus the water will flow from all the beds, except the one being washed, along the passage, over the field being washed and out into the outlet channel—see arrows in upper half of Fig. 1.

$d$ designates a channel of reinforced concrete or some other similar material for carrying the dirty water, slime, &c., collected from washing the fields to the outlet pipe $h$ and having edges $e$ extending slightly above the surface of the said beds or fields, and forming a weir on which are secured the wickets $f$, corresponding in number with the number of fields.

$g$ designates inlet pipe introducing filtered water into the channel $i$, from whence it flows through outlets $j$ near the bottom of said channel $i$ up through the sand and, as shown by the arrow in Figs. 2 and 3, after being used to wash the sand surface, out through channel $d$ and outlet pipe $h$ as shown in Fig. 1.

A modified form of my invention is shown in the lower half of Fig. 1. This provides for introducing unfiltered water from pipe $b$ directly into the fields by turning the faucet $c$ situated at the outer end of each field and on the side of said pipe $b$, thus each field is washed separately (see lower half of Fig. 1) and there is no need to control the water as in my preferred form, therefore the wickets or gates $f$ may be dispensed with as unnecessary and the partitions $a$ carried entirely across from the outer ends of said fields to the side of each channel $d$, in this form of my invention.

The operation of cleaning or washing is as follows, according to the preferred form. The level of the water is lowered to about the level shown in Fig. 2, then filtered water is introduced through the inlet pipe $g$, inlet channel $i$, and outlets $j$—flowing upward through the sand, and one of the wickets being open (see upper half of Fig. 1, third field) the water will all flow over the surface of this field and thoroughly cleanse the same and flow off from the filter through channel $d$ and outlet pipe $b$. When it is desired to wash field 2 merely close the wicket of field three and open that of field two and so on, it being necessary in all instances to stir up the surface of the field to be washed, preferably before starting the foregoing operation.

In my modified form as shown in the lower half of Fig. 1, if I wish to wash field five as shown I stir the surface, and turn the spigot $c$ to introduce the water, which may be unfiltered from pipe $b$ into said field. When this field has been washed I turn off its spigot $c$ going to field four which is washed in like manner, then to field three and so on until the whole bed has been washed, the wickets $f$ not being necessary in this form. The current of the water in both instances is preferably just sufficient to carry away the slime &c, it being undesirable to have it strong enough to hurt the bed of the fields.

Having thus described my invention what I claim as new and desire to secure by Letters Patent is:

1. In filter basins, partitions, which divide the sand beds into a series of fields, and a common outlet channel, in combination with an inlet pipe, an inlet channel having outlets at its bottom for distributing the supply of water and weirs for separating and making at will communication to the common outlet channel.

2. In filter basins, partitions dividing the sand bed into a series of fields, a common outlet channel and pipe and a weir or grate at the end of each field on top of and separating while closed, said field from said channel, in combination with means for slowly introducing water into said bed.

3. In a filter basin, partitions dividing the sand surface into a series of fields, a common outlet channel extending across said bed and weirs or grates at the end of said fields for opening or closing as desired communication between said fields and said channel.

4. In a filter basin, partitions dividing the sand surface into a series of fields, a common outlet channel extending across the bed the upper edge of said channel being situated above the sand surface.

5. In filter basins, partitions dividing the sand surface into a series of beds connected by a common passageway at their outer ends a common outlet channel, and means of opening and closing communication between said fields and said channel.

In testimony whereof, I have signed my name to this specification in the presence of two subscribing witnesses.

JOHAN GUSTAF RICHERT.

Witnesses:
    HEDWING MELINDER.
    NOWALD NYSTROM.